United States Patent
She et al.

(10) Patent No.: US 11,404,972 B2
(45) Date of Patent: Aug. 2, 2022

(54) POWER MODULE AND CONVERTER WITH ASYMMETRICAL SEMICONDUCTOR RATING ARRANGEMENT

(71) Applicant: Carrier Corporation, Palm Beach Gardens, FL (US)

(72) Inventors: Xu She, Cohoes, NY (US); Ismail Agirman, Southington, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/104,186

(22) Filed: Nov. 25, 2020

(65) Prior Publication Data

US 2021/0159807 A1 May 27, 2021

Related U.S. Application Data

(60) Provisional application No. 62/939,826, filed on Nov. 25, 2019.

(51) Int. Cl.
*H02M 7/219* (2006.01)
*H02M 1/088* (2006.01)
*H02M 5/458* (2006.01)

(52) U.S. Cl.
CPC ........... *H02M 7/219* (2013.01); *H02M 1/088* (2013.01); *H02M 5/458* (2013.01)

(58) Field of Classification Search
CPC ...... H02M 7/219; H02M 1/088; H02M 5/458; H02M 7/487; H02K 9/20; H02P 27/085
See application file for complete search history.

(56) References Cited

U.S. PATENT DOCUMENTS

| 3,138,690 A | * | 6/1964 | Webb | B23H 1/026 219/69.19 |
| 5,909,367 A | * | 6/1999 | Change | H02M 5/297 363/163 |
| 5,936,855 A | * | 8/1999 | Salmon | H02M 1/4216 363/46 |

(Continued)

FOREIGN PATENT DOCUMENTS

| CN | 201418024 Y | 3/2010 |
| CN | 101340159 B | 6/2011 |

(Continued)

OTHER PUBLICATIONS

CN Office Action; dated Jan. 26, 2021; Application No. 202011328453.9; Filed: Nov. 24, 2020; 1 page.

(Continued)

*Primary Examiner* — Yusef A Ahmed
(74) *Attorney, Agent, or Firm* — Cantor Colburn LLP

(57) ABSTRACT

Systems for operating a rectifier are provided. Aspects include a rectifier including a set of bridge structures configured to receive an input current of a power supply, wherein each bridge structure in the set of bridge structures includes a set of diodes and a set of active switches, wherein each active switch in the set of active switches is configured to provide a parallel path around each diode in the set of diodes when in a PWM state, a controller configure to determine a threshold current for the rectifier and operate one or more active switches in the rectifier in a PWM state based on the input current being less than the threshold current.

8 Claims, 5 Drawing Sheets

(56) References Cited

U.S. PATENT DOCUMENTS

| | | | | |
|---|---|---|---|---|
| 7,190,143 B2* | 3/2007 | Wei | | H02M 7/219 |
| | | | | 318/606 |
| 9,906,183 B1* | 2/2018 | Agirman | | H02M 7/487 |
| 10,044,258 B2 | 8/2018 | Bryant | | |
| 10,654,682 B2* | 5/2020 | Agirman | | B66B 1/308 |
| 2007/0268051 A1* | 11/2007 | Kerkman | | H02M 1/44 |
| | | | | 327/175 |
| 2009/0284200 A1* | 11/2009 | Iwahori | | H02M 7/48 |
| | | | | 318/400.27 |
| 2011/0025236 A1* | 2/2011 | Takizawa | | H02M 5/4585 |
| | | | | 318/139 |
| 2011/0116293 A1* | 5/2011 | Tabata | | H02M 7/487 |
| | | | | 363/132 |
| 2012/0018777 A1* | 1/2012 | Takizawa | | H03K 17/0828 |
| | | | | 257/140 |
| 2012/0092915 A1* | 4/2012 | Okuda | | H02M 7/501 |
| | | | | 363/132 |
| 2012/0155135 A1* | 6/2012 | Fujii | | H02M 7/487 |
| | | | | 363/98 |
| 2012/0205983 A1* | 8/2012 | Koyanagi | | H02M 7/483 |
| | | | | 307/77 |
| 2013/0094258 A1* | 4/2013 | Royak | | H02M 1/32 |
| | | | | 363/89 |
| 2013/0176753 A1* | 7/2013 | Swamy | | H02M 1/4216 |
| | | | | 363/37 |
| 2013/0193897 A1* | 8/2013 | Iwashita | | H02P 27/085 |
| | | | | 318/503 |
| 2013/0308357 A1* | 11/2013 | Amano | | H02M 7/49 |
| | | | | 363/71 |
| 2014/0112039 A1* | 4/2014 | Correa Vasquez | | H02M 7/487 |
| | | | | 363/98 |
| 2014/0139159 A1* | 5/2014 | Sato | | H02M 1/32 |
| | | | | 318/400.22 |
| 2014/0176027 A1* | 6/2014 | Osaki | | H02P 6/28 |
| | | | | 318/400.2 |
| 2014/0247634 A1* | 9/2014 | Takizawa | | H02P 27/14 |
| | | | | 363/132 |
| 2014/0268954 A1* | 9/2014 | Wei | | H02M 5/4585 |
| | | | | 363/89 |
| 2015/0092460 A1* | 4/2015 | Tallam | | G01R 31/64 |
| | | | | 363/44 |
| 2015/0162864 A1* | 6/2015 | Moghadas | | H02M 1/36 |
| | | | | 318/504 |
| 2016/0285388 A1* | 9/2016 | Alexander | | H03K 17/66 |
| 2016/0311645 A1* | 10/2016 | Agirman | | B66B 1/308 |
| 2017/0005562 A1* | 1/2017 | Agirman | | H02P 3/18 |
| 2017/0029242 A1* | 2/2017 | Agirman | | B66B 1/302 |
| 2017/0063219 A1* | 3/2017 | Hyodo | | H02M 1/34 |
| 2017/0077836 A1* | 3/2017 | Ginart | | H02J 7/02 |
| 2017/0244334 A1* | 8/2017 | Ohnishi | | H02M 7/487 |
| 2017/0264187 A1* | 9/2017 | Lu | | H02H 9/026 |
| 2017/0317607 A1* | 11/2017 | Agirman | | H02P 27/14 |
| 2018/0262045 A1* | 9/2018 | Ohnishi | | H02M 7/537 |
| 2019/0020271 A1* | 1/2019 | Fu | | H02M 1/4208 |
| 2019/0140555 A1* | 5/2019 | Chen | | H02M 1/00 |
| 2019/0173410 A1* | 6/2019 | Agirman | | H02P 3/14 |
| 2019/0238062 A1* | 8/2019 | Lu | | H03K 17/122 |
| 2020/0177020 A1* | 6/2020 | Mouridsen | | H02J 1/102 |
| 2020/0280267 A1* | 9/2020 | Restrepo | | H02M 7/5388 |
| 2020/0295668 A1* | 9/2020 | Bortis | | H02M 1/4216 |
| 2020/0373853 A1* | 11/2020 | Haryani | | H02M 7/53876 |
| 2021/0067052 A1* | 3/2021 | Hu | | H02M 5/293 |

FOREIGN PATENT DOCUMENTS

| | | |
|---|---|---|
| CN | 206698143 U | 12/2017 |
| CN | 206992981 U | 2/2018 |
| CN | 207083025 U | 3/2018 |
| CN | 105471297 B | 4/2018 |
| CN | 108155820 A | 6/2018 |
| CN | 108233402 A | 6/2018 |
| CN | 108964489 A | 12/2018 |
| CN | 108964490 A | 12/2018 |
| CN | 108988668 A | 12/2018 |
| CN | 108988669 A | 12/2018 |
| CN | 109039118 A | 12/2018 |
| CN | 109039119 A | 12/2018 |
| CN | 109067216 A | 12/2018 |
| CN | 106549581 B | 5/2019 |
| CN | 108512407 B | 8/2019 |
| EP | 3113345 A1 | 1/2017 |
| WO | 2017134293 A1 | 8/2017 |
| WO | 2018161524 A1 | 9/2018 |
| WO | 2018209866 A1 | 11/2018 |
| WO | 2018210285 A1 | 11/2018 |
| WO | 2018210301 A1 | 11/2018 |

OTHER PUBLICATIONS

EP Search Report; dated Apr. 8, 2021; EP Application No. 20209422. 3; Filed: Nov. 24, 2020; 7 pages.

Hu et al., "Integrated dead-time compensation and elimination approach for model predictive power control with fixed switching frequency," IET Power Electronics, vol. 12, No. 5, 2019, pp. 1220-1228.

Monteiro et al., "Model Predictive Control Applied to an Improved Five-Level Bidirectional Converter," IEE Transactions on Industrial Electronics, vol. 63, No. 9, Sep. 2016, pp. 5879-5890.

* cited by examiner

POWER MODULE AND CONVERTER WITH ASYMMETRICAL SEMICONDUCTOR RATING ARRANGEMENT

CROSS-REFERENCE TO RELATED APPLICATIONS

This application claims the benefit of U.S. Provisional Patent Application No. 62/939,826 filed Nov. 25, 2019, which is incorporated herein by reference in its entirety.

BACKGROUND

Exemplary embodiments pertain to the art of AC-DC converters, and more specifically, to a power module and converter with asymmetrical semiconductor rating arrangement.

A chiller is a machine that removes heat from a liquid via a vapor-compression or absorption refrigeration cycle. This liquid can then be circulated through a heat exchanger to cool equipment, or another process stream (such as air or process water). As a by-product, refrigeration creates waste heat that must be exhausted to ambience, or for greater efficiency, recovered for heating purposes. In air conditioning systems, chilled water is typically distributed to heat exchangers, or coils, in air handlers or other types of terminal devices which cool the air in their respective space(s). The water is then recirculated to the chiller to be re-cooled. These cooling coils transfer sensible heat and latent heat from the air to the chilled water, thus cooling and usually dehumidifying the air stream.

A chiller utilizes an alternating current (AC) motor to drive a compressor utilized to compress and heat refrigerant utilized in the chiller and passes this through a condenser and later an evaporated to provided chilled air in an HVAC system. For high tier chiller applications, a low total harmonic current distortion (THD) is needed from converters driving an AC motor.

BRIEF DESCRIPTION

Embodiments of the present disclosure are directed to a device. A non-limiting example of the device includes one or more active switches, one or more diodes, wherein each active switch in the one or more active switches is in parallel with a corresponding diode in the one or more diodes, wherein each active switch of the one or more active switches includes a first current rating, wherein each diode in the one or more diodes includes a second current rating, and wherein the first current rating in at least one order of magnitude less than the second current rating.

Embodiments of the present disclosure are directed to a system. A non-limiting example of the system includes a rectifier including a set of bridge structures configured to receive an input current of a power supply, wherein each bridge structure in the set of bridge structures includes a set of diodes and a set of active switches, wherein each active switch in the set of active switches is configured to provide a parallel path around each diode in the set of diodes when in a PWM state, a controller configured to determine a threshold current for the rectifier and operate one or more active switches in the rectifier in a PWM state based on the input current being less than the threshold current.

Embodiments of the present disclosure are directed to system. A non-limiting example of the system includes a rectifier including a first bridge structure configured to receive an input current from a power supply, wherein the first bridge structure includes a first diode and a second diode, a first active switch and second active switch, wherein the first active switch provides a first parallel path around the first diode when in a PWM state; and wherein the second active switch provides a second parallel path around the second diode when in a PWM state; and a controller configured to determine a threshold current for the rectifier and operate the first active switch in the rectifier in a PWM state based on the input current being less than the threshold current.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Turning now to technologies relevant to the aspects of the current disclosure. High tier chiller applications typically require a low total harmonic current distortion for better operation. A Vienna rectifier can be utilized when the low total harmonic current distortion (THD) is required for these high tier chiller applications. The Vienna rectifier has the benefit of low active device count while still maintaining high current quality. However, the harmonic performance of the Vienna rectifier deteriorates when the current is lower than a certain threshold (e.g., 10%). T-type rectifiers can meet the harmonic current requirement across the whole current range but has a higher total cost.

According to the one or more embodiments, aspects of the present disclosure solve the short comings of the above described issues by providing an asymmetrical semiconductor arrangement for the T-type rectifier. Specifically, an insulated gate bipolar transistor (IGBT) current rating of a half-bridge in the T-type rectifier is sized to be much smaller than a diode current rating in the same bridge structure. In the present rectifier circuit, the IGBTs in the bridge structure are enabled only when the load power is lower than a certain threshold when current distortion becomes an issue. In this case, a small current and low cost IGBT can be selected for the bridge structure with satisfactory current harmonic performance across the entire operating ranges.

Figure 1:
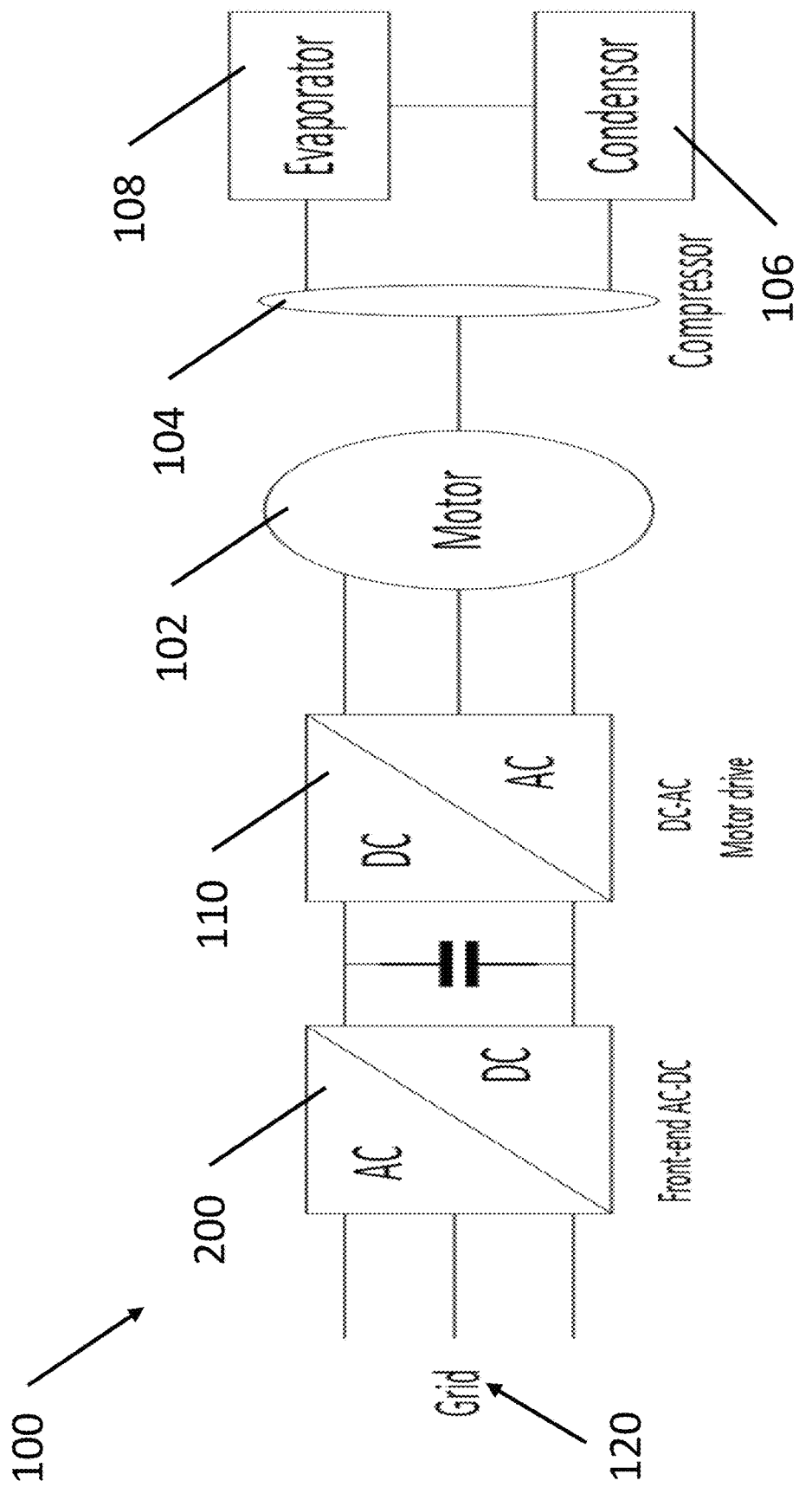
FIG. 1 illustrates a basic block diagram of an exemplary chiller system including a variable speed motor that is coupled to a compressor according to one or more embodiments.

Referring now to the drawings, FIG. 1 illustrates a basic block diagram of an exemplary chiller system 100 including a variable speed motor 102 that is coupled to a compressor 104 according to one or more embodiments. The compressor 104 includes an impeller/rotor that rotates and compresses liquid refrigerant to a superheated refrigerant vapor for delivery to a condenser 106. In the condenser 106, the refrigerant vapor is liquefied at high pressure and rejects heat (e.g., to the outside air via a condenser fan in an air-cooled chiller application). The liquid refrigerant exiting condenser 106 is delivered to an evaporator 108 through an expansion valve (not shown). The refrigerant passes through the expansion valve where a pressure drop causes the high-pressure liquid refrigerant to achieve a lower pressure combination of liquid and vapor. As chilled water passes through the evaporator 108, the low-pressure liquid refrigerant evaporates, absorbing heat from the water, thereby further cooling the water and evaporating the refrigerant. The low-pressure refrigerant is again delivered to compressor 104 where it is compressed to a high-pressure, high temperature gas, and delivered to condenser 106 to start the refrigeration cycle again. It is to be appreciated that while a specific refrigeration system is shown in FIG. 1, the present teachings are applicable to any refrigeration or HVAC system Also shown in FIG. 1, chiller system 100 includes a compressor 104 driven by a variable speed motor 102 from power supplied from a grid 120 (or mains) through an AC-DC converter (rectifier) 200 and an inverter drive (sometimes referred to as an "DC-AC motor drive") 110. Inverter drive 110 includes solid-state electronics to modulate the frequency of electrical power on line. In an embodiment, inverter drive 110 converts the AC electrical power, received from grid 120, from AC to direct current (DC) using a rectifier 200, and then converts the electrical power from DC to a pulse width modulated (PWM) voltage, using an inverter 110, at a desired frequency in order to drive the motor 102.

Figure 2:
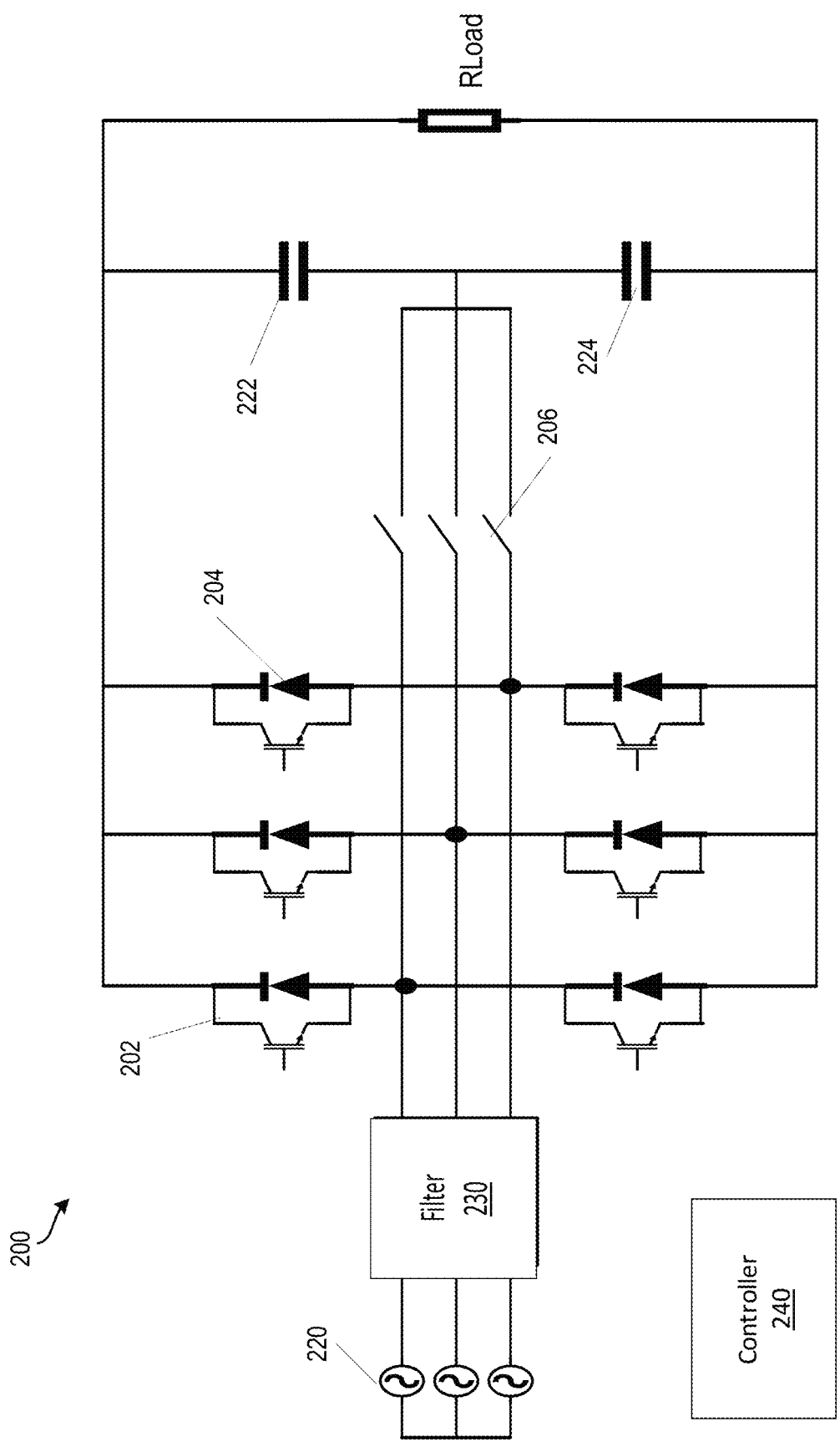
FIG. 2 depicts a circuit topology of a rectifier according to one or more embodiments.

The rectifier 200 is further depicted in FIG. 2. FIG. 2 depicts a circuit topology of a rectifier 200 according to one or more embodiments. The rectifier 200 is configured with three bridge structures, each bridge structure including a set of bypass switches 202 and a set of diodes 204. In the illustrated example, the bridge structures are in a half bridge configuration and each include two active switches 202 and two diodes 204. However, in one or more embodiments, a full bridge structure can be utilized. Also, in one or more embodiments, the active switches 202 can be any type of switch including, but not limited to, an insulated gate bipolar transistor (IGBT) or a metal-oxide-semiconductor filed effect transistor (MOSFET). The three bridge structures are coupled to a filter circuit 230. The filter circuit 230 is coupled to a three-phase alternating current (AC) power supply 220. The combination of the three-phase power supply 220 and filter 230 supplies power in three different phases (typically offset by 120 degrees) to the bridge structures. The bridge structures each receive power in a different phase and then rectifies the AC power signal to a DC power signal. The rectifier 200 also includes a capacitor bridge made up of two capacitor 222, 224 which are utilized to smooth the DC output power signal. The rectifier 200 also includes a set of bi-direction switches 206. These bi-direction switches 206 allow the creation of a kind of active filter, which operates in parallel to half bridge diode rectifiers. Through the active control of the middle branch bidirectional switches 206, it provides the additional paths for the input current. Therefore the current at the grid side 220 becomes sinusoidal with low harmonic contents. Note that the three bi-directional switches 206 are interconnected at the mid-point of a capacitor bridge, made up of two capacitors 222, 224 needed to ensure voltage balancing. RLoad is the load on the rectifier 200.

In one or more embodiments, the rectifier 200 also includes a controller 240 that is utilized to operate the active switches 202 and the bi-directional switches 206. In one or more embodiments, the rectifier 200 can operate as a standard Vienna type rectifier when the active switches 202 are operated in an off-state. The rectifier 200 can be operated as a T-type rectifier when the active switches 202 are controlled in a pulse width modulation (PWM) fashion. In one or more embodiments, the controller 240 controls the operation of both the active switches 202 and the bi-direction switches 206. The controller 240 can determine (or receive) a threshold current for utilization in operation of the rectifier 200. The threshold current can be determined based on where the lower current of the AC power supply begins to cause current distortion. When the input current to the bridge structures is less than or below this threshold current, the rectifier 200 operates as a T-type rectifier and the active switches 202 are operated in parallel with the diodes 204. When the input current to the bridge structures is greater than the threshold current, the rectifier 200 operates as a Vienna rectifier and the current can only flow through the diodes 204 and active switches 202 are in OFF state. In one or more embodiments, the current rating of the active switches 202 is much smaller than the current rating of the diodes 204 in these bridge structures of the rectifier 200. In one or more embodiments, the current rating of the active switches 202 can be an order of magnitude smaller than the current rating of the diodes 204. When operate in Vienna rectifier mode, the harmonic distortion becomes large at light load condition as the input current becomes discontinuous due to unidirectional power flow feature. This harmonic distortion can be corrected if the active switches are enabled in PWM mode. In this case, the active switches provide additional current path, making the harmonics of input current much reduced.

Figure 3:
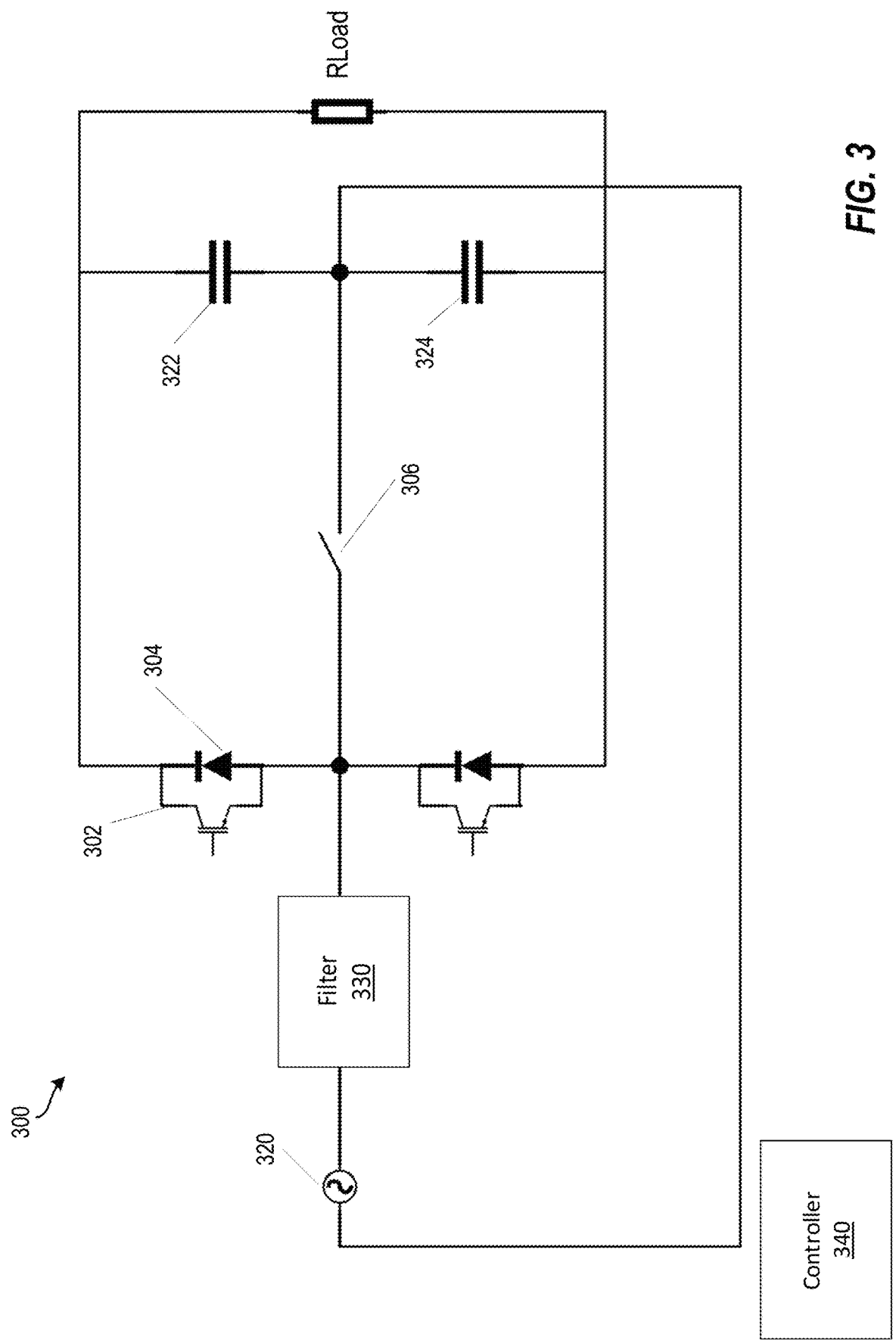
FIG. 3 depicts a rectifier topology with a single phase power supply according to one or more embodiments.

FIG. 3 depicts a rectifier topology with a single phase power supply according to one or more embodiments. The rectifier 300 includes a single bridge structure that includes a set of two active switches 302 and a set of two diodes 304. In the illustrated example, the bridge structure is in a half bridge configuration and each include two active switches 302 and two diodes 304. However, in one or more embodiments, a full bridge structure can be utilized. Also, in one or more embodiments, the active switches 320 can be any type of switch including, but not limited to, an insulated gate bipolar transistor (IGBT) or a metal-oxide-semiconductor filed effect transistor (MOSFET). The bridge structure is coupled to a filter circuit 330. The filter circuit 330 is coupled to a single-phase alternating current (AC) power supply 320. The bridge structure receives power through the filter 220 from the power supply 320 and then rectifies the AC power signal to a DC power signal. The rectifier 300 also includes a capacitor bridge made up of two capacitor 322, 324 which are utilized to smooth the DC output power signal. The rectifier 300 also includes a set of bi-direction switches 306. These bi-direction switches 306 allow the creation of a kind of active filter, which operates in parallel to half bridge diode rectifiers. Through the active control of the middle branch bidirectional switches 306, it provides the additional paths for the current. Therefore the current at the grid side 320 becomes sinusoidal with low harmonic contents. Note that the three bi-directional switches 306 are interconnected at the mid-point of a capacitor bridge, made up of two capacitors 322, 324 needed to ensure voltage balancing. The rectifier 300 drives a DC load (RLoad).

In one or more embodiments, the rectifier 300 also includes a controller 340 that is utilized to operate the active switches 302 and the bi-directional switch 306. In one or more embodiments, the controller 340 controls the operation of both the active switches 302 and the bi-direction switch 306. The controller 340 can determine (or receive) a threshold current for utilization in operation of the rectifier 300. The threshold current can be determined based on where the lower current of the AC power supply begins to cause current distortion. When the input current to the bridge structures is less than or below this threshold current, the rectifier 300 operates as a T-type rectifier and one or more of the active switches 302 are operated to create a bypass path around the diodes 304. When the input current to the bridge structures is greater than the threshold current, the rectifier 300 operates the active switches 302 in an off state and the current can flow through the diodes 304 through forward bias. In one or more embodiments, the current rating of the active switches 302 is much smaller than the current rating of the diodes 304 in these bridge structures of the rectifier 300. In one or more embodiments, the current rating of the active switches 302 can be an order of magnitude smaller than the current rating of the diodes 304.

Figure 4B:
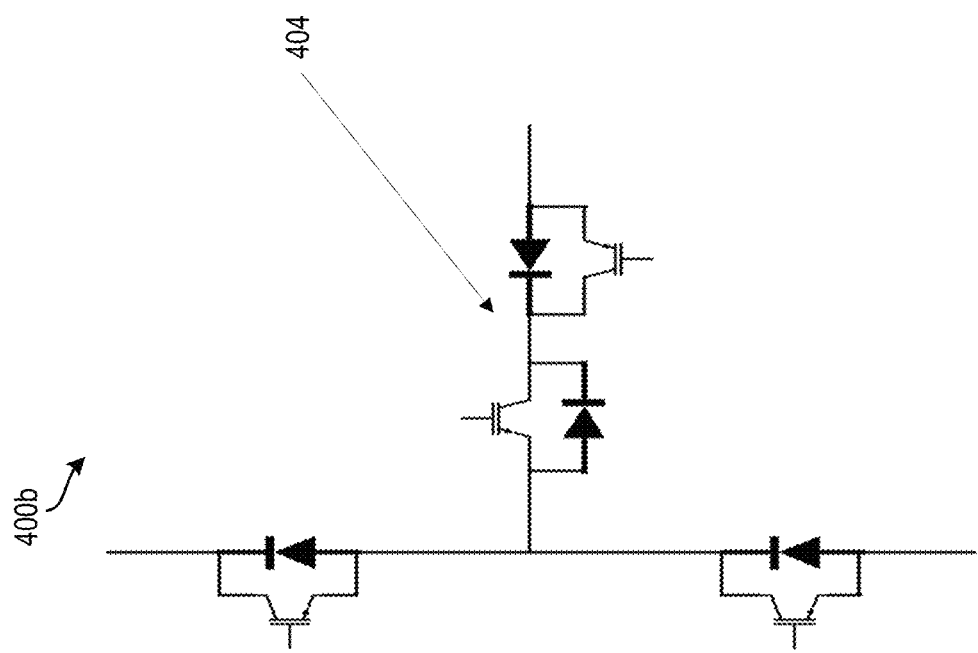
FIGS. 4a and 4b depict circuit topologies of the bi-directional switches in the rectifier circuit according to one or more embodiments.
Figure 4A:
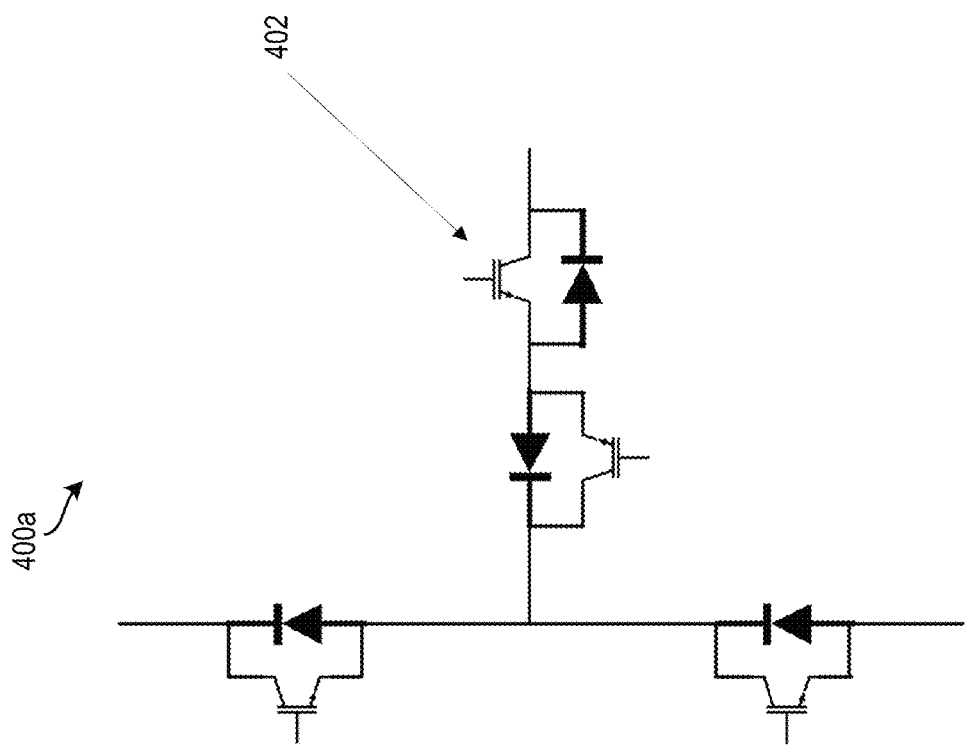

FIGS. 4a and 4b depict circuit topologies of the bi-directional switches in the rectifier circuit according to one or more embodiments. The circuit topology 400a includes a bi-direction switch 402, in which the IGBTs are connected in a common emitter way. The circuit topology 400b includes a bi-direction switch 404, in which the IGBTs are connected in a common collector way. The benefit of the 402 over 404 is that it simplifies the gate driver power supply design for the two IGBTs in the bi-direction switch.

Figure 5:
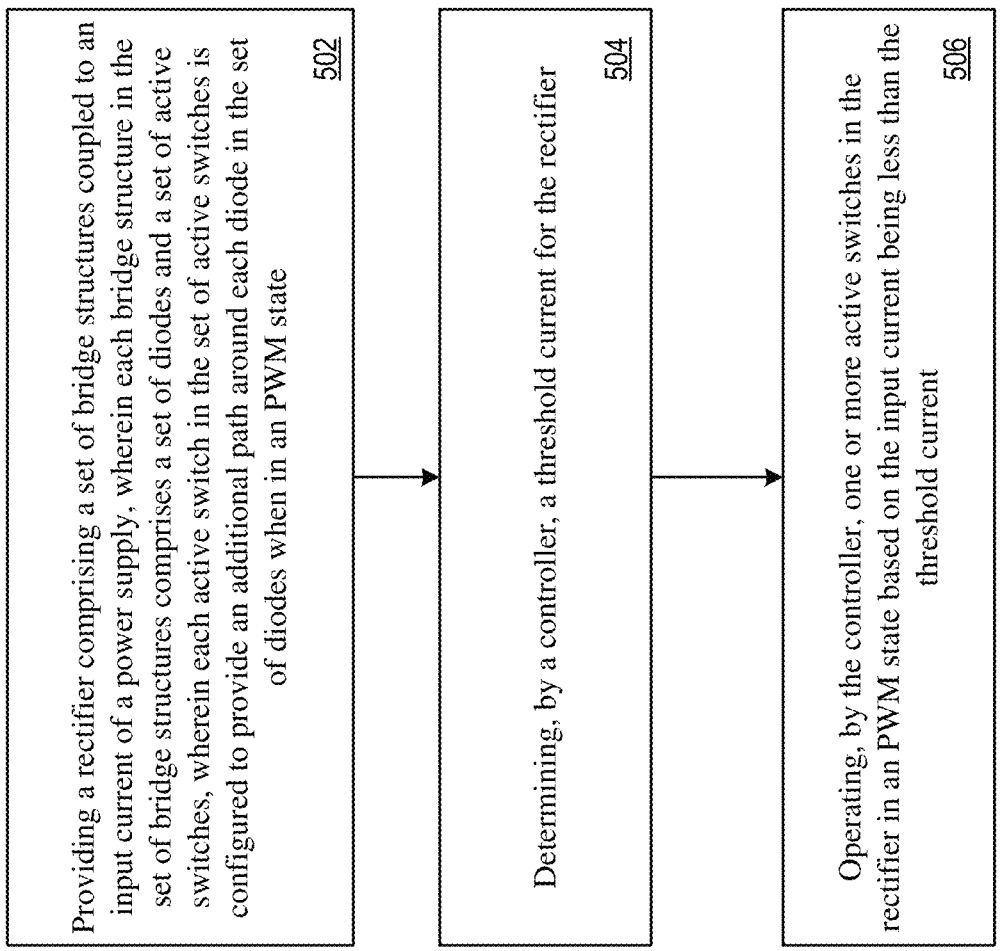
FIG. 5 depicts a flow diagram of a method for operating a rectifier according to one or more embodiments.

FIG. 5 depicts a flow diagram of a method for operating a rectifier according to one or more embodiments. The method 500 includes providing a rectifier comprising a set of bridge structures coupled to an input current of a power supply, wherein each bridge structure in the set of bridge structures comprises a set of diodes and a set of active switches, wherein each active switch in the set of active switches is configured to provide a parallel path around each diode in the set of diodes when in an on state, as shown at block 502. At block 504, the method 500 includes determining, by a controller, a threshold current for the rectifier. And at block 506, the method 500 includes operating, by the controller, one or more active switches in the rectifier in a PWM stage based on the input current being less than the threshold current.

Additional processes may also be included. It should be understood that the processes depicted in FIG. 5 represent illustrations, and that other processes may be added or existing processes may be removed, modified, or rearranged without departing from the scope and spirit of the present disclosure.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A power device assembly comprising:
   one or more active switches;
   one or more diodes;
      wherein each active switch in the one or more active switches is in parallel with a corresponding diode in the one or more diodes, wherein the one or more active switches comprise insulated gate bipolar transistors (IGBT);
      wherein each active switch of the one or more active switches comprise a first current rating;
      wherein each diode in the one or more diodes comprises a second current rating; and
      wherein the first current rating is at least one order of magnitude less than the second current rating;
   a power supply comprising a three-phase power supply configured to supply an input current to the one or more diodes and the one or more active switches;
   a plurality of bi-directional switches coupled to the one or more diodes and the one or more active switches, wherein each bi-directional switch of the plurality of bi-directional switches comprises two IGBTs and two diodes, and wherein the plurality of bi-directional switches are directly connected to a node between a first smoothing capacitor and a second smoothing capacitor; and
   a controller configure to:
      determine a threshold current for the power device assembly; and
      operate the one or more active switches in a pulse width modulation (PWM) state based on the input current being less than the threshold current.

2. The power device assembly of claim 1, wherein the controller is further configured to:
   operate the one or more active switches in an off state based on the input current exceeding the threshold current.

3. A system comprising
   a rectifier comprising:
      a plurality of bridge structures configured to receive an input current from a power supply, wherein each bridge structure in the plurality of bridge structures comprises a plurality of diodes and a plurality of active switches, wherein each active switch in the plurality of active switches is configured to provide a parallel path around each respective diode in the plurality of diodes when in a PWM state; and wherein the power supply comprises a three-phase power supply configured to supply the input current to the rectifier;
a plurality of bi-directional switches coupled to the plurality of bridge structures; and
a controller configure to:
 determine a threshold current for the rectifier; and
 operate one or more active switches of the plurality of active switches in the rectifier in the PWM state based on the input current being less than the threshold current, wherein the plurality of active switches comprise insulated gate bipolar transistors (IGBT), and wherein a current rating of the plurality of active switches is an order of magnitude less than a current rating of the plurality of diodes,
 wherein each bi-directional switch of the plurality of bi-directional switches comprises two IGBTs and two diodes, and wherein the plurality of bi-directional switches are directly connected to a node between a first smoothing capacitor and a second smoothing capacitor at an output of the rectifier.

4. The system of claim 3, wherein the controller is further configured to:
 operate the plurality of active switches in the rectifier in an off state based on the input current exceeding the threshold current.

5. The system of claim 3, wherein the plurality of bridge structures comprise half bridge structures.

6. The system of claim 3, wherein the plurality of bridge structures comprise full bridge structures.

7. A system comprising:
 a rectifier comprising at least one bridge structure, the at least one bridge structure comprising a first bridge structure configured to receive an input current from a power supply, wherein the power supply comprises a three-phase power supply configured to supply the input current to the rectifier, wherein the first bridge structure comprises
  a first diode and a second diode;
  a first active switch and second active switch, wherein the first active switch provides a first parallel path around the first diode when in a PWM state; and wherein the second active switch provides a second parallel path around the second diode when in the PWM state;
 a plurality of bi-directional switches coupled to the at least one bridge structure, wherein each bi-directional switch of the plurality of bi-directional switches comprises two IGBTs and two diodes, and wherein the plurality of bi-direction switches are directly connected to a node between a first smoothing capacitor and a second smoothing capacitor at an output of the rectifier; and
 a controller configure to:
  determine a threshold current for the rectifier; and
  operate the first active switch in the rectifier in the PWM state based on the input current being less than the threshold current, wherein the first active switch comprises insulated gate bipolar transistors (IGBT), and wherein a current rating of the first active switch is an order of magnitude less than a current rating of the first diode.

8. The system of claim 7, wherein the controller is further configured to:
 operate the first active switch in the rectifier in an off state based on the input current exceeding the threshold current.

* * * * *